UNITED STATES PATENT OFFICE.

AUGUSTE HENRI PERRET, OF PARIS, FRANCE.

PROCESS OF EXTRACTING METALS.

1,028,774.      Specification of Letters Patent.      Patented June 4, 1912.

No Drawing.      Application filed November 21, 1910. Serial No. 593,509.

*To all whom it may concern:*

Be it known that I, AUGUSTE HENRI PERRET, a citizen of the French Republic, residing at Paris, in France, have invented a certain new and useful Process of Extracting Metals, of which the following is a specification.

As is well known various processes have already been suggested for extracting from natural products or from residues metallic oxids such as those of vanadium, molybdenum or tungsten, which may be found in such natural products or residues. To these metals I give the generic term, metals of the vanadium group.

As regards more particularly vanadium which is generally extracted from ores in which vanadium is found in combination, among other substances, with lead, silica, lime, alumina and oxids of iron, copper and arsenic, the process generally employed is substantially as follows: First of all the vanadium-bearing lead-ores are melted in a reverberatory furnace with a mixture of carbon and carbonate of sodium, the proportions of which are calculated in accordance with the composition of the ore. The lead oxids are thus reduced, and metallic lead is obtained, as well as a slag in which the whole vanadium is contained in the form of various oxids. The slag in question is then poured on the ground where it is crushed to small pieces, and left in the open air for 8–10 days, whereupon it becomes oxidized and partly hydrated. The product thus obtained is then brought into crumbling vats where, in order to bring about its disintegration and to extract its valuable constituents it is sprinkled with water or lyes containing a small quantity of vanadic acid $V_2O_5$, and where the concentration of the liquor obtained is continued until it reaches 10–15° Baumé. The liquor thus obtained is decanted in deposit vats, and the slag which has not yet been disaggregated, is submitted to a further extracting operation in which, if necessary, a steam jet is used, and which is carried on so as to obtain a new liquor having 10–15° Baumé, which liquor is in its turn decanted in the said deposit vats, after which there is obtained in the said vats a slimy deposit, and liquid. The latter liquid is removed, and the slimy deposit in question filtered and washed; the liquid resulting from the latter operations is mixed with the last mentioned liquid, and one third of the liquid thus obtained, is taken and evaporated until its concentration reaches about 45° Baumé, whereupon it is treated with sulfuric acid so as to obtain a precipitate of vanadic acid. This precipitate is washed and filtered, and the other two thirds of the said mixed liquids are added to it, and the whole is boiled so as to precipitate the whole of the silica and to obtain finally a liquor containing vanadic acid, which liquor is sufficient then to treat with sulfuric acid in order to precipitate from it the said vanadic acid.

The process described gives ultimately oxids of vanadium, the degree of oxidation of which at the most corresponds to the formula $V_2O_5$ and has, among other disadvantages, that of necessitating a great expenditure of time, of lengthy stoppages of the installation and, more particularly, that of making it impossible to extract completely the vanadic acid contained in the products treated: 2–3% remain in the residue. This is obvious for, the first operation consisting in submitting the raw materials to a reduction, a portion of the said acid must necessarily be rendered insoluble, more particularly in the presence of silicates. Moreover, if the ores treated contain, as is generally the case, arsenic, the latter substance not having been eliminated in the process described, and having necessarily to be eliminated at least partially as its presence would render useless for metallurgical purposes the vanadic acid obtained, it is necessary to treat the latter acid so as to bring about the separation of the arsenic. The present invention however obviates the above disadvantages.

It relates to a process applicable to any metals which, like vanadium, molybdenum and tungsten, present several stages of oxidation, and the highest oxid or oxids of which are soluble in molten or dissolved alkalis or alkaline carbonates, the process in question consisting in principle in treating any products, whether natural ores or residue of treatment containing the metal in question, no longer in a reducing medium, but in an oxidizing medium, so as to bring the metal in question to its highest state or states of oxidation and thus to render it soluble and easy to separate.

It is obvious that it can be carried out in any suitable manner, more particularly and preferably as described below where it has been assumed that it is desired to obtain superoxidized compounds of vanadium.

When products containing vanadium are to be treated, such for instance as: slags obtained by the treatment of vanadates or chloro-vanadates of lead from which lead has been already extracted; ores, silicates or other substances in which vanadium is combined, among other substances, with silica, lime, alumina and iron; by-products of manufacture, iron or other vanadates; or vanadium-containing slime obtained by processes of the kind mentioned above, and containing with 2–3% of vanadic acid $V_2O_5$ or lower oxids of vanadium as $V_2O_3$ and $V_2O_4$, silica, iron, alumina, or other substances, the mass of the said vanadium-containing products is mixed with a certain proportion of alkaline carbonate, for instance carbonate of sodium, sufficient to insure the fusion of the said mass as well as the solution of vanadium as soon as the latter has been completely converted into vanadic and pervanadic acids; the said proportion being calculated in accordance with the quantity of silica contained in the vanadium-containing mass treated, preferably so that its weight should be equal, or slightly inferior, to that of the said quantity of silica. The mixture thus formed is then introduced into a fusion furnace, for instance into a reverberatory furnace, in successive portions, and as soon as the furnace in question is almost completely filled, either an oxidizing substance, such as for instance nitrate of sodium or nitrate of lime, is projected on the bath thus formed, the latter substances being preferably mixed with their weight of sodium carbonate and taken in the proportion of 1–2% of the vanadium-containing mass treated; or a mixture comprising at the same time as the said oxidizing agent (whether mixed with sodium carbonate or not) quick lime—the latter substance being preferably taken in the form of coarse powder and in a proportion (which depends on the contents of silica in the said mass) of 3–4% on the average—the final result being in any case, in addition to the oxidation of the vanadium, simultaneous oxidation of the arsenic. When the oxidation is completed, which will be readily seen at the disappearance of reddish vapors, the molten mass is cast, and that can be effected by two different methods.

The first method which is more particularly suitable for ores rich in vanadium and poor in silica, is as follows: The molten mass is cast into a vat filled either with cold water, or with a weak lye obtained by the final extraction of valuable constituents from slags obtained by a previous treatment. The casting thus effected, has the following results: it produces a partial decomposition of the water, which is adapted to advance still more the oxidation obtained in the furnace, it "shocks" the slag and consequently disintegrates it almost completely and facilitates its subsequent reduction to powder, it produces an almost immediate solution of about half the vanadium contained in the said slag, and finally it enables the subsequent concentration to take place very quickly, and consequently in a very economical manner. The liquor obtained in the manner described is collected, and conveyed into the deposit vats, preferably of high and narrow shape. On the other hand, the "shocked" slag, also obtained in the manner just described, is conveyed to the crushing device, whereupon the said slag is treated with hot water until it no longer contains any soluble vanadium, the lyes obtained by this process being subsequently utilized for "shocking" fresh slag and being thus methodically or gradually concentrated. The said liquor conveyed to the deposit vats, is subsequently removed, while on the contrary the slime left by the said tapping or removal is passed through the filter press and washed, so as to obtain new lyes which can also be added to the "shocking" liquid, the liquor in question containing in fact, among other substances, pervanadate, vanadate, silicate and aluminate of sodium and, in very small proportion, other impurities.

The second of the methods in question, applicable chiefly to ores poor in vanadium and rich in silica, is as follows: The molten mass is no longer thrown into water, but simply on the ground, preferably into pits about 15–20 cm. deep, so as to obtain a comparatively thick block which is allowed to cool slowly and is subsequently crushed without having been first "shocked." It is then sufficient to extract the valuable constituents by successive treatments with boiling water, from the slag in question which is previously reduced in a crushing machine and finely ground, in order to obtain a liquor containing the same substances as those mentioned above, which are contained in the liquor obtained by the application of the first method of casting described.

In order to extract vanadium compounds from the liquor obtained by the application of one or the other of the said methods of casting, various processes may be employed, for example, precipitation in the state of ammonium vanadate by means of hydrochlorate of ammonia, or the direct precipitation to the state of vanadic acid. In the latter case, it is advantageous to extract the compounds by one of the following two methods:

The first of the said methods is as follows: After having, for instance by means of a steam circulation, brought the liquor to a concentration of 45° Baumé, and treated it with sulfuric acid of 53° Baumé until, while still remaining very alkaline, it has allowed to precipitate practically the whole of the silica therein contained, its temperature is raised to, and maintained at, about 80° C., and for instance by means of a metal netting cage which is vertically reciprocated, vanadic acid obtained by a previous operation, is introduced into it, which becomes dissolved while completing the precipitation of the silica. The whole is then left to stand, decanted, filtered hot, and an oxidizing agent is added, such as an alkaline hypochlorite, in the proportion of about 1% of the vanadium compounds to be obtained, and the precipitation is effected in the usual manner, for instance by means of sulfuric acid, of the vanadic and pervanadic acids contained in the liquid obtained by the filtration just mentioned, which acids are finally collected after having been passed through a filter press and dried. The said liquid, and that obtained by the passage through the filter press, are on the other hand preferably submitted, for the purpose of extracting from it the last traces of vanadium that may have remained, to the action of a suitable substance, such for instance, as a ferric chlorid, carbonate of sodium, lime and chlorid of lime, in the result, a small quantity of iron vanadate is obtained which is conveyed into the melting furnace; and on the other hand, in order to take into account that silica successively precipitated by sulfuric acid and by vanadic acid, also carries away, in fact, traces of vanadium, the silica in question is treated with a solution of carbonate of sodium, and the solution obtained is mixed with that obtained during the treatment of the slag.

As regards the second of the two methods mentioned in the last instance, which method has the advantage of completely, or at least amost completely, eliminating the silica, it is as follows: After having brought the liquor to a concentration of about 45° Baumé, and having further treated it with sulfuric acid of 53° Baumé, but this time in a quantity sufficient for obtaining the exact neutralization, the liquor is decanted; the precipitate obtained is washed with water containing in solution about 1–2% of carbonate of sodium; and the said precipitate is then passed through a filter-press. The said precipitate, which is substantially a mixture of vanadium compounds and silica, is then digested, for one or two hours, for instance in lyes of carbonate of sodium containing, as regards the carbonate, about double of the weight of the vanadium compounds of the precipitate submitted to digestion, and to the mass in digestion, is added, either before the digestion is started, or during the digestion, a sufficient quantity of an oxidizing body which is preferably an alkaline or alkaline-earth hypochlorite, such as for instance, chlorid of soda, or chlorid of lime, in order that the liquor should turn to Vermouth yellow. In these conditions, all the vanadium becomes again dissolved in the state of vanadic and pervanadic acids, while the silica remains insoluble. It is then sufficient to pass again through the filter press, to bring the liquors to a concentration of about 40° Baumé, to treat with sulfuric acid (either of 53° Baumé or diluted with water equal to one or two of its volumes), to wash with a solution of a very diluted carbonate of sodium; to pass again through the filter press, to dry the precipitate collected and to calcine it.

As regards the liquors obtained from the different filtrations and still containing a small proportion of vanadium, they are precipitated by a ferric salt, or by ferrous sulfate, in the presence of sodium carbonate, lime and chlorid of lime, in order to enable the vanadic acid therein contained to be extracted.

It must be pointed out that the two methods for a direct precipitation of vanadic and pervanadic acids described, can be applied, without departing from the spirit of the invention, also in the case in which it is question of lyes obtained by the usual treatment process by reduction hereinbefore described, and that the same applies to the use of "shocking" in the said usual process. It must be moreover pointed out that the product obtained by the application of the invention to the vanadium-containing products, is not a vanadium oxid of the formula $V_2O_5$ but a mixture of two oxids with the respective formulæ $V_2O_5$ and $V_2O_7$.

What I claim as my invention and desire to secure by Letters Patent is:—

1. The hereindescribed process for the treatment of substances containing metals of the vanadium group, which comprises forming a molten bath of such substance and subjecting such bath to the action of an oxidizing medium until such substance has reached its highest state of oxidation.

2. The hereindescribed process for the treatment of substances containing metals of the vanadium group, which comprises mixing such substance with a sufficient proportion of alkaline carbonate to insure fusion thereof, melting such mixture and subjecting it to the action of an oxidizing agent, and casting the molten mass immediately upon completion of oxidation.

3. The hereindescribed process for the treatment of substances containing metals of the vanadium group, which comprises mixing the substance to be treated with a sufficient proportion of alkaline carbonate to insure fusion thereof, melting said mixture in a reverberatory furnace and projecting an oxidizing agent upon the bath thus formed, casting the substance as soon as it has reached a maximum state of oxidation, and treating the cast substance with boiling water.

4. The hereindescribed process for the treatment of substances containing metals of the vanadium group, which consists in mixing the substance to be treated with a sufficient proportion of alkaline carbonate to insure fusion thereof, melting the mixture thus formed and projecting an oxidizing agent upon the molten bath, casting the molten substance as soon as oxidation has been completed, forming a liquor containing the substance to be treated, concentrating such liquor, mixing the concentrated liquor with acid of a quantity sufficient to effect exact neutralization of the liquor, introducing a higher oxid of the metal to be obtained into the liquor, forming a precipitate of the liquor, treating the precipitate in the presence of an oxidizing agent, and recovering traces of the metal.

5. The hereindescribed process for the treatment of substances containing metals of the vanadium group, which consists in mixing the substance to be treated with a suitable proportion of alkaline carbonate to insure fusion thereof, melting such mixture to form a molten bath and treating such bath with an oxidizing agent, casting the molten mass after the oxidizing operation has been completed, forming a liquor containing the constituents of said substance, adding an acid to such liquor to effect exact neutralization thereof and to form a precipitate, decanting the liquor immediately after neutralization, washing the precipitate with water mixed with an alkaline carbonate, filtering the liquor and precipitate, digesting the precipitate with alkaline carbonate lyes, adding an oxidizing agent, eliminating the silica which has remained insoluble, precipitating the vanadate and pervanadate contained in such solutions, and washing and drying the precipitate thus obtained.

In testimony whereof I have signed my name to this specification in the presence of two subscribing witnesses.

AUGUSTE HENRI PERRET.

Witnesses:
  H. C. COXE,
  PAUL BLUM.